(12) United States Patent
Schmidt et al.

(10) Patent No.: US 11,686,371 B2
(45) Date of Patent: Jun. 27, 2023

(54) COAXIAL GEAR MECHANISM

(71) Applicant: Wittenstein SE, Igersheim (DE)

(72) Inventors: Michael Schmidt, Reichenberg (DE);
Martin Kimmelmann, Weikersheim (DE); Heiko Schreiber, Doberschau (DE); Thomas Bayer, Igersheim (DE)

(73) Assignee: Wittenstein SE, Igersheim (DE)

( * ) Notice: Subject to any disclaimer, the term of this patent is extended or adjusted under 35 U.S.C. 154(b) by 69 days.

(21) Appl. No.: 17/495,149

(22) Filed: Oct. 6, 2021

(65) Prior Publication Data

US 2022/0107002 A1 Apr. 7, 2022

(30) Foreign Application Priority Data

Oct. 6, 2020 (DE) .......................... 102020126107.1

(51) Int. Cl.
*F16H 1/24* (2006.01)
(52) U.S. Cl.
CPC ...................................... *F16H 1/24* (2013.01)
(58) Field of Classification Search
CPC ................................. F16H 1/24; F16H 49/001
See application file for complete search history.

(56) References Cited

U.S. PATENT DOCUMENTS

| | | | | |
|---|---|---|---|---|
| 2,070,777 A | * | 2/1937 | Benbow | F16H 55/10 |
| | | | | 74/415 |
| 3,550,476 A | * | 12/1970 | Young | F16H 49/001 |
| | | | | 74/640 |
| 2003/0047025 A1 | | 3/2003 | Ruttor et al. | |
| 2003/0089194 A1 | * | 5/2003 | Ruttor | F16H 25/06 |
| | | | | 74/640 |
| 2009/0205451 A1 | | 8/2009 | Bayer et al. | |
| 2017/0138456 A1 | * | 5/2017 | Dorner | F16H 25/06 |
| 2022/0107003 A1 | * | 4/2022 | Bayer | F16H 57/12 |
| 2022/0178430 A1 | * | 6/2022 | Kimmelmann | F16H 37/02 |
| 2022/0252140 A1 | * | 8/2022 | Eisele | F16H 25/06 |

FOREIGN PATENT DOCUMENTS

| | | |
|---|---|---|
| DE | 10010156 C1 | 10/2001 |
| DE | 102006042786 A1 | 3/2008 |
| DE | 102007016189 A1 | 10/2008 |

* cited by examiner

*Primary Examiner* — Terence Boes

(74) *Attorney, Agent, or Firm* — Bachman & LaPointe, P.C.

(57) ABSTRACT

Coaxial gear mechanism (1), having a toothing (5) oriented axially with respect to an axis of rotation (3) of the coaxial gear mechanism (1), a tooth carrier (7) with axially oriented guides (9), tooth pins (11) which each have a body (41), which is mounted in an axially displaceable manner in a guide (9) of the tooth carrier (7), and a head region (51), wherein the head region (51) has at least one tooth (53) for engagement with the toothing (5), and wherein the head region (51) is configured to be wider than the body (41).

15 Claims, 6 Drawing Sheets

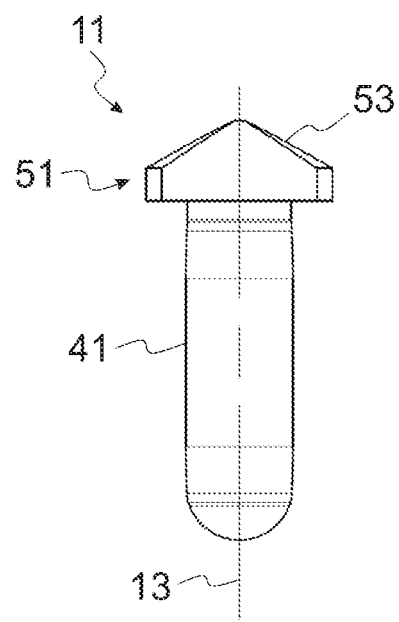
Fig. 6A
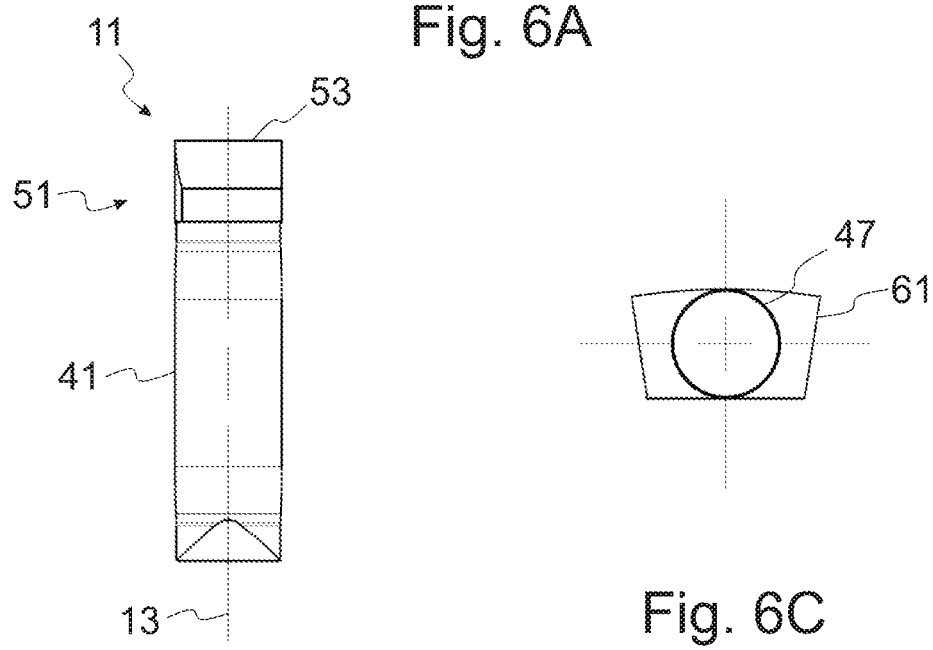
Fig. 6B
Fig. 6C

COAXIAL GEAR MECHANISM

BACKGROUND OF THE INVENTION

The invention relates to a coaxial gear mechanism and to a use of a coaxial gear mechanism.

From the prior art, gear mechanisms are known which comprise tooth pins which are mounted displaceably in a tooth carrier. For driving the tooth pins, drive elements with a profiling, such as, for example, cam disks, are used. The tooth pins are moved in the tooth carrier and engage into a toothing, such that a relative movement occurs between the tooth carrier with the tooth pins and the toothing. The relative movement between toothing and tooth pins is in this case smaller than the movement of the drive element with the profiling. In this way, it is possible to achieve high transmission ratios.

However, previously known solutions from the prior art have restrictions, in particular with respect to the load-bearing capacity of the gear mechanism, with respect to the transmission ratio of the gear mechanism or with respect to the compactness of the gear mechanism.

SUMMARY OF THE INVENTION

It is an object of the invention to specify a coaxial gear mechanism which is improved in relation to coaxial gear mechanisms known from the prior art, wherein it is sought in particular to achieve a higher load-bearing capacity, a higher transmission ratio or a more compact construction. It is furthermore an object of the invention to specify a use of such a coaxial gear mechanism.

The object is achieved by means of a coaxial gear mechanism as disclosed herein and by means of a use according to the further disclosed herein. Advantageous refinements and embodiments emerge from the dependent claims and from this description.

One aspect of the invention relates to a coaxial gear mechanism, having a toothing oriented axially with respect to an axis of rotation of the coaxial gear mechanism, a tooth carrier with axially oriented guides, tooth pins which each comprise a body, which is mounted in an axially displaceable manner in a guide of the tooth carrier, and a head region, wherein the head region comprises at least one tooth for engagement with the toothing, and wherein the head region is configured to be wider than the body.

A further aspect of the invention relates to a use of a coaxial gear mechanism according to one of the embodiments described herein.

Expressions such as "axially", "radially" or "circumferential direction" are typically to be understood to mean with respect to the axis of rotation of the coaxial gear mechanism, for example with respect to the axis of rotation of the cam disk of the coaxial gear mechanism.

In typical embodiments, the guides of the tooth carrier are oriented axially with respect to the axis of rotation of the coaxial gear mechanism. The tooth pins are typically mounted in an axially displaceable manner in the guides of the tooth carrier. A tooth pin is typically mounted displaceably in precisely one direction, typically in the direction of the longitudinal axis of the tooth pin, in a guide of the tooth carrier. This can be achieved, for example, by the tooth pin having a constant cross section in the displacement direction over a certain length, in particular over a certain length of the body along the longitudinal axis of the tooth pin. The tooth pins can be accommodated in the guide in such a manner that the tooth pin is mounted displaceably axially with respect to the axis of rotation of the coaxial gear mechanism along the longitudinal axis in the guide. A guide for a tooth pin in the tooth carrier is typically designed as a bore or opening with a cross section which is constant in the axial direction. The bore or opening is typically configured to be continuous in the axial direction through the tooth carrier. Further typical tooth carriers comprise rectangular milled portions or elongated holes or slots as guides. In typical embodiments, the tooth carrier engages around the axis of rotation in the circumferential direction. In particular, the tooth carrier can be configured to be circular or annular.

In typical embodiments, the coaxial gear mechanism comprises a cam disk, which is rotatable about the axis of rotation, for axially driving the tooth pins. The cam disk typically comprises a profiling as drive element for axially driving the tooth pins, in particular by means of an axial stroke of the tooth pins. The profiling is typically designed along the circumferential direction of the cam disk with at least one elevation in the axial direction, in particular with at least two or at least three elevations. The cam disk, the tooth carrier and the toothing are typically arranged in this sequence in an axial direction. Driving of the cam disk with the profiling enables a force to be exerted on the tooth pins in the direction of the respective longitudinal axis of the tooth pins such that the tooth pins are pressed in the guides of the tooth carrier in the direction of the toothing.

Typical coaxial gear mechanisms comprise an axially oriented toothing. In particular, the toothing can be designed as a toothing of a crown gear. The toothing typically comprises toothing teeth which are arranged in a row next to one another in the circumferential direction. The toothing teeth typically in each case comprise two toothing flanks.

Typical coaxial gear mechanisms have a drive shaft and an output shaft. The drive shaft and the output shaft are typically mounted rotatably about the axis of rotation of the coaxial gear mechanism. The drive shaft or the output shaft or both are typically designed as hollow shafts. The cam disk is typically provided on the drive shaft. In typical embodiments, the tooth carrier is provided on the output shaft, wherein in particular the toothing or a crown gear with the toothing is connected to a housing of the coaxial gear mechanism for rotation therewith, or is not rotatable relative to the housing. In further typical embodiments, a toothing or a crown gear with the toothing is provided on the output shaft, wherein in particular a tooth carrier is connected to a housing of the coaxial gear mechanism for rotation therewith, or is not rotatable relative to the housing.

In typical embodiments, the tooth pins each comprise a body which is mounted in an axially displaceable manner in a guide of the tooth carrier. The body typically extends along the longitudinal axis of a tooth pin. The longitudinal axis of the tooth pin is typically oriented at least substantially parallel to the axis of rotation of the coaxial gear mechanism. The body is typically at least partially accommodated in a guide of the tooth carrier. The body can have an at least substantially constant cross section along the longitudinal axis of the tooth pin. In typical embodiments, a cross-sectional area of the body that is perpendicular to the longitudinal axis of the tooth pin, also called "second cross-sectional area" herein, is configured to be round. In particular, the cross-sectional area of the body can be configured to be circular. The body is typically configured to be at least substantially cylindrical. In further typical embodiments, the body has an at least partially non-round cross-sectional area, for example a polygonal cross-sectional area or a round cross-sectional area with at least one flattened portion, in particular a circular cross-sectional area with at least one flattened portion.

At least a part of the tooth pins is typically of flexurally rigid design. The expression "flexurally rigid" is typically to be understood technically here to mean that, owing to the stiffness of the material of the tooth pins, bending movements of the tooth pins are so small that they are at least substantially insignificant for the kinematics of the coaxial gear mechanism.

In embodiments, the tooth pin comprises a tooth pin base in an end region of the tooth pin facing the cam disk. The tooth pin base is typically configured for mounting the tooth pin on a bearing segment of the coaxial gear mechanism or on the cam disk. A tooth pin is typically mounted in each case on a respective bearing segment. For example, the tooth pin base of a tooth pin can be mounted loosely or in a sliding manner on a bearing segment. In embodiments, the tooth pin base has an arching, in particular an arching in the axial direction. The arching is typically configured for mounting the tooth pin in a recess of a bearing segment. In typical embodiments, the bearing segments of the coaxial gear mechanism are configured for mounting the tooth pins on the cam disk, in particular for mounting the tooth pins on the profiling of the cam disk. For example, the bearing segments can be mounted in a sliding manner on the cam disk. The bearing segments can each be configured to be pivotable in the circumferential direction in relation to respective adjacent bearing segments. In embodiments, the bearing segments are produced from metal. In further embodiments, the bearing segments can be produced from plastic.

In typical embodiments, the tooth pins each comprise a head region. The head region typically comprises at least one tooth for engagement with the toothing. A tooth typically comprises two tooth flanks. The tooth typically comprises a tooth head. The tooth head typically forms the transition between the two tooth flanks of the tooth. The tooth head is typically rounded. The tooth head is typically at least substantially oriented radially. The head region typically comprises a base between the body of a tooth pin and the at least one tooth. The at least one tooth is typically arranged on the base, in particular on a side of the base that faces the toothing.

The head region is typically configured to be wider than the body in the circumferential direction about the axis of rotation. The head region can be configured to be wider than the body in particular in one circumferential direction or in both circumferential directions. In particular, the head region can be widened in relation to the body in a mirror-symmetrical manner with respect to a plane of symmetry which is parallel to the longitudinal axis of the tooth pin and is oriented radially with respect to the axis of rotation.

In typical embodiments, a head region width of the head region in the circumferential direction is at least 1.2 times wider, in particular 1.5 times wider, than a body diameter of the body in the circumferential direction. The head region width can be determined in particular as the diameter of the head region in the circumferential direction. For example, the diameter of the head region can be determined radially on the inside of the head region, centrally with respect to the body cross section, or radially on the outside of the head region. In typical embodiments, an angle width of the head region with respect to the axis of rotation is at least 1.2 times wider, in particular 1.5 times wider, than a body angle width of the body with respect to the axis of rotation.

In embodiments, the head region is configured to be wider than the body in the radial direction. The head region can be widened radially inwards or radially outwards with respect to the axis of rotation of the coaxial gear mechanism, in particular radially inwards and radially outwards. In typical embodiments, the head region in the radial direction is at least 1.2 times wider, in particular at least 1.3 times wider or at least 1.5 times wider than the body. In embodiments, the head region is configured to be wider than the body in particular in the circumferential direction and in the radial direction. Widening of the head region can afford the advantage in particular that an engagement surface for engagement of the at least one tooth of a tooth pin with the toothing is enlarged. In further typical embodiments, the head region in the radial direction is substantially the same width as the body.

A first cross-sectional area of the head region that is perpendicular to the longitudinal axis of a tooth pin, in particular a base of the head region, is typically at least 1.5 times larger, in particular at least 1.7 times larger or at least 2 times larger, larger than a second cross-sectional area of the body that is perpendicular to the longitudinal axis. For example, the first cross-sectional area of the head region can be approximately 2 times larger than the second cross-sectional area of the body. The at least one tooth of a head region typically overlaps a tooth surface that is perpendicular to the longitudinal axis, wherein the tooth surface is at least 1.2 times larger than the second cross-sectional area of the body, in particular at least 1.5 times larger or at least 1.7 times larger. The tooth surface is typically smaller than or equal to the first cross-sectional area of the head region.

In typical embodiments, a first cross-sectional area of the head region that is perpendicular to a longitudinal axis of the tooth pin comprises two edges oriented radially with respect to the axis of rotation. The first cross-sectional area of the head region is typically a cross-sectional area of a base of the head region. The radially oriented edges can include the pitch angle of the tooth pins in the circumferential direction in particular with respect to the axis of rotation. In typical embodiments, the first cross-sectional area is bounded radially inwards or radially outwards by an arc of a circle or by a straight line, for example radially outwards by an arc of a circle and radially inwards by a straight line.

In embodiments, the first cross-sectional area of the head region at least substantially forms a trapezoid, a section of a circular ring or a circular partial surface. In embodiments with a first cross-sectional area configured as a trapezoid, the trapezoid can comprise two edges oriented radially with respect to the axis of rotation. The trapezoid can comprise at least one chord of a circle with a centre point on the axis of rotation. In embodiments with a first cross-sectional area configured as a circular partial surface, the circular partial surface can comprise, for example, two arcs of a circle, in particular two arcs of a circle with a centre point on the longitudinal axis of the tooth pin. The circular partial surface can be bounded by two edges oriented radially with respect to the axis of rotation. Embodiments having a circular partial surface as the first cross-sectional area can be produced as a turned part.

An angular width of the head region, in particular of a base of the head region, with respect to the axis of rotation is typically at least substantially identical to a pitch angle of the tooth pins. The pitch angle of the tooth pins is calculated, for example, as 360° divided by the number of tooth pins in the tooth carrier. In particular, two radially oriented edges of the head region, in particular of the first cross-sectional area of the head region, can include the angular width with respect to the axis of rotation. The angular width of the head region is to be understood as meaning in particular the extent of the head region in terms of angle with respect to the axis of rotation. The angular width is determined in particular in a plane perpendicular to the axis of rotation and through the head region. The head regions of the tooth pins inserted in the tooth carrier typically form an axially toothed ring about the axis of rotation.

In typical embodiments, the head region of a tooth pin forms a sliding contact with head regions of tooth pins which are adjacent in the circumferential direction. In particular, the head regions of adjacent tooth pins in the circumferential direction can butt against one another or be supported on one another by way of the sliding contact. The head regions can slide on one another in the axial direction by way of the sliding contact. The sliding contact is typically formed on a base of the head region. The sliding contact is typically configured to secure the tooth pins against rotation of the tooth pins about the respective longitudinal axis of the tooth pins. For example, head regions of adjacent tooth pins can be supported on one another by way of a sliding contact between respective radially oriented sliding surfaces. According to embodiments described herein, the radially oriented sliding surfaces can comprise in particular radially oriented edges of the first cross-sectional area. The sliding contact between head regions of adjacent tooth pins can be configured in particular as a surface contact. In further embodiments, the sliding contact can be configured as a linear contact along an axial direction at at least one radial position, in particular at at least two radial positions.

Typical coaxial gear mechanisms comprise a rotation lock which comprises a sliding surface for sliding contact with a radial inner surface of the head region or a radial outer surface of the head region. In embodiments, the sliding surface of the rotation lock is at least partially arranged radially within the tooth pins, in particular for providing a sliding contact with the radial inner surface of the head region. In embodiments, the sliding surface of the rotation lock is at least partially arranged radially outside the tooth pins, in particular for providing a sliding contact with the radial outer surface of the head region. The sliding contact between the sliding surface of the rotation lock and the radial inner surface or the radial outer surface can be configured for sliding the head region in the axial direction. The rotation lock is typically configured to secure a tooth pin against rotation about the longitudinal axis of the tooth pin. In particular, the sliding contact can be configured in such a manner that the head region is supported on the sliding surface of the rotation lock against rotation about the longitudinal axis of the tooth pin. The rotation lock can be configured, for example, annularly about the axis of rotation.

In embodiments, the rotation lock is connected to the tooth carrier for rotation therewith or to a housing of the coaxial gear mechanism for rotation therewith. In embodiments, the rotation lock is produced as a separate component. In further embodiments, the rotation lock is produced integrally with the tooth carrier or with the housing.

The head region in the axial direction typically has an axial height of at least 1.5 times the tooth height of the at least one tooth, in particular of at least 2 times the tooth height or of at least 3 times the tooth height. The tooth height of a tooth is to be understood as meaning in particular a height of the tooth in the axial direction. The axial height of the head region comprises in particular an axial base height of a base of the head region and the tooth height of the at least one tooth. The head region in the axial direction typically has an axial height of at maximum 6 times the tooth height of the at least one tooth, in particular of at maximum 5 times the tooth height or of at maximum 4 times the tooth height.

In typical embodiments, the head region comprises an individual tooth, in particular an individual tooth with precisely two tooth flanks. The individual tooth typically has in the circumferential direction a tooth width which is wider than the body diameter of the body in the circumferential direction. In particular, the tooth width can be at least substantially identical to the head region width of the head region. An individual tooth, in particular a wide individual tooth, can advantageously provide a high degree of overlap of the toothing or low transmission ratios.

In typical embodiments, the head region comprises at least two teeth for engagement with the toothing, in particular at least three or at least four teeth. The head region typically comprises a maximum of 15 teeth, in particular a maximum of 10 teeth or a maximum of 8 teeth. The teeth typically each comprise two tooth flanks. The teeth are typically lined up next to one another in the circumferential direction. The tooth heads of the teeth are typically oriented radially. The tooth pins typically each have the same number of teeth. Tooth pins with more than one tooth can afford the advantage that the tooth pins can be operated with a smaller tooth stroke for engagement of the teeth with the toothing. In particular, bending loads can be reduced, for example in the tooth pins or in a mounting of the tooth pins on the cam disk.

A tooth pitch angle of the at least two teeth of the head region of a tooth pin is typically at least substantially identical or identical to a multiple of a toothing pitch angle of the toothing, in particular at least substantially identical to an integral multiple. The tooth pitch angle is determined, for example, from the angle which two teeth which are adjacent in the circumferential direction, in particular teeth heads of the adjacent teeth, of a head region enclose with respect to the axis of rotation. The toothing pitch angle of the toothing is calculated, for example, as 360° divided by the number of the toothing teeth of the toothing.

In typical embodiments, a total number of the teeth of the tooth pins of the coaxial gear mechanism is unequal to the number of the toothing teeth of the toothing. A calculated number of teeth is typically unequal to the number of the toothing teeth of the toothing. The calculated number of teeth is determined in particular as the integral multiple of the number of the guides or of the number of the tooth pins closest to the number of the toothing teeth. In embodiments, the calculated number of teeth differs from the number of the toothing teeth of the toothing by the number of elevations of the cam disk. Typical coaxial gear mechanisms can be configured to provide a transmission ratio of the coaxial gear mechanism of at least 3, in particular of at least 4 or at least 5, or of at maximum 250, in particular of at maximum 220 or at maximum 200.

In embodiments, depending on the elevation of the cam disk, at least two teeth are simultaneously in engagement at equal depths with the toothing. For example, a high degree of overlap of the toothing, in particular use over the full surface area, can advantageously be achieved. An advantage can be that higher torques can be transmitted or a higher stiffness of the coaxial gear mechanism is provided. During operation of the coaxial gear mechanism, the longitudinal axis of a tooth pin is typically always at least substantially parallel to the axis of rotation. In particular, an exclusive sliding contact can be provided between the teeth of the tooth pins and the toothing.

In typical embodiments, tooth flanks of a tooth pin or toothing flanks of the toothing, in particular the tooth flanks and the toothing flanks, run at least partially along helical lines about the axis of rotation. Two tooth flanks of a tooth or two toothing flanks of a toothing tooth typically run along respective flank lines in a pointed manner in the direction of the axis of rotation of the coaxial gear mechanism. In embodiments, a tooth flank or a toothing flank can at least partially run along a helical surface. In particular, a flat engagement of the tooth flanks and of the toothing flanks can be provided. In embodiments with tooth pins having in each case at least two teeth, upon engagement with the toothing, identical engagement ratios can advantageously be provided for the at least two teeth with the same axial stroke.

Typical embodiments of the coaxial gear mechanism can afford the advantage over the prior art that a wider transmission ratio range of the coaxial gear mechanism can be provided. Embodiments can provide a higher degree of overlap of the toothing or use over the full surface area. Higher torques can be transmitted in particular. Typical coaxial gear mechanisms can advantageously have a higher load-bearing capacity of the coaxial gear mechanism or a higher stiffness. Typical embodiments can be constructed more compactly. In typical embodiments, securing of the tooth pins against rotation can be provided in the head region of the tooth pin. It is advantageously possible, for example, to dispense with a securing against rotation on a tooth pin base or on the body. Typical embodiments can afford the advantage that the tooth pins for engagement of the teeth with the toothing can be operated with a smaller tooth stroke. In particular, bending loads can be reduced.

BRIEF DESCRIPTION OF THE DRAWINGS

The invention will be explained in more detail below with reference to the attached drawings, wherein, in the figures:

FIGS. 6A-C show schematic views of a tooth pin according to a further typical embodiment.

DETAILED DESCRIPTION

Typical embodiments of the invention will be described below on the basis of the figures, wherein the invention is not restricted to the exemplary embodiments; rather, the scope of the invention is defined by the claims. In the description of the embodiments, in some cases in different figures and for different embodiments, the same reference designations are used for identical or similar parts. For the sake of clarity, features which have already been described in conjunction with other figures will sometimes not be described again. For clarity, sometimes not all the respective features are provided with a reference designation, for example the teeth (reference designation 53 in FIGS. 2A to 5).

Figure 1:
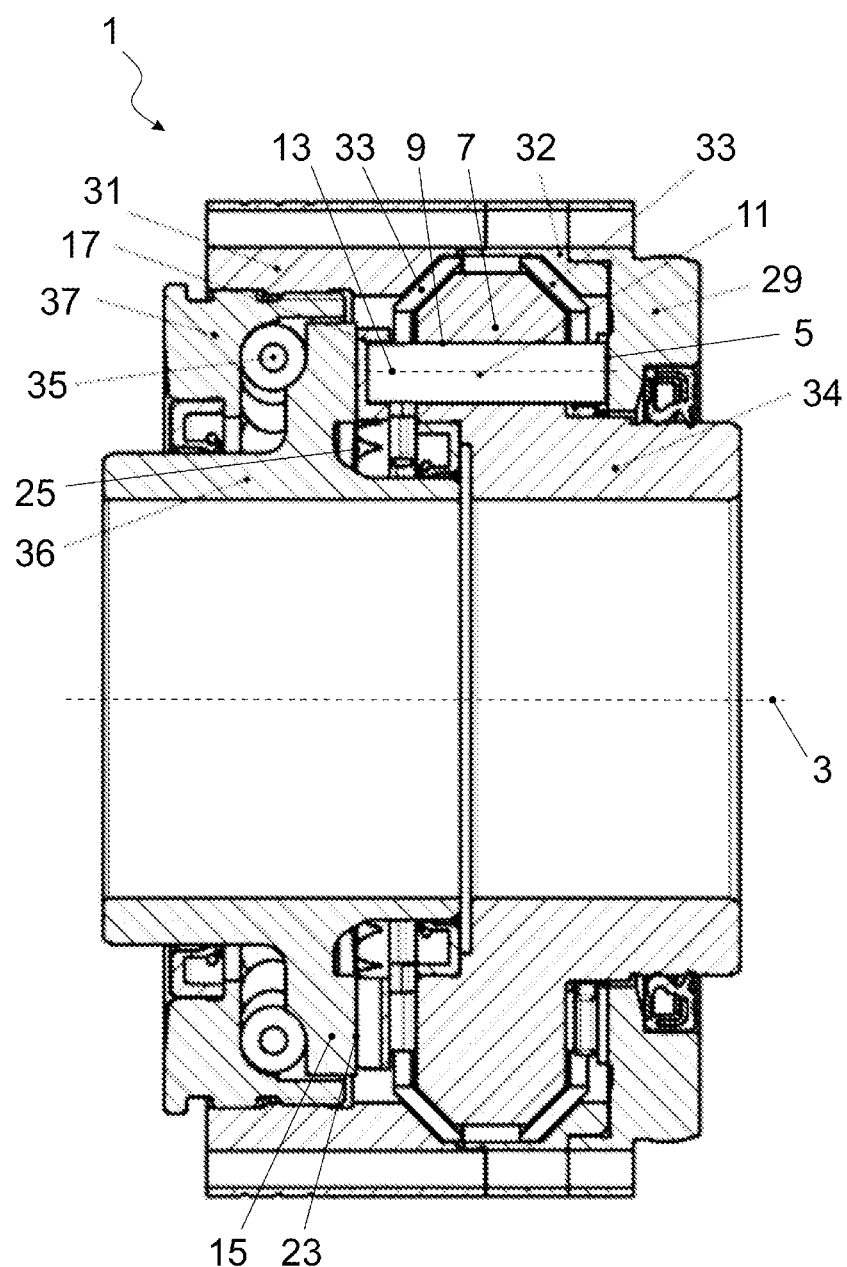
FIG. 1 shows a typical embodiment of the coaxial gear mechanism in a schematic sectional view.

FIG. 1 illustrates a cutout of a typical embodiment in a schematic sectional view. FIG. 1 shows a coaxial gear mechanism 1 with a toothing 5 which is oriented axially with respect to an axis of rotation 3 of the coaxial gear mechanism 1. The toothing 5 is designed as a toothing of a crown gear 29 in a manner encircling the axis of rotation 3. The crown gear 29 is connected to a housing of the coaxial gear mechanism 1 for rotation therewith. For example, in FIG. 1, the crown gear 29 is connected to a first housing part 31 and to a second housing part 32 of the housing of the coaxial gear mechanism 1 for rotation with said housing parts.

The coaxial gear mechanism 1 comprises a tooth carrier 7 which is provided on an output shaft 34. The tooth carrier 7 is mounted on the housing via a first bearing so as to be rotatable about the axis of rotation 3. The first bearing comprises, for example, first rolling bodies 33. The tooth carrier 7 has axially oriented guides 9 in which tooth pins 11 are in each case accommodated. The tooth pins 11 are mounted along their respective longitudinal axes 13 in the guides 9 so as to be displaceable axially with respect to the axis of rotation 3. The longitudinal axes 13 of the tooth pins 11 are oriented parallel to the axis of rotation 3.

The tooth pins 11 each comprise a head region with, for example, five teeth which are oriented for engagement with the toothing 5. The tooth pins 11 each comprise a tooth pin base which protrudes from the guide 9 of the respective tooth pin 11 and is mounted on a bearing segment 17. A tooth pin 11 furthermore comprises a body between the tooth pin base and the head region, wherein the body is at least partially accommodated in the guide 9. An arching of the tooth pin base is located in a recess of the bearing segment 17.

The bearing segments 17 are each mounted on a profiling 25 of a cam disk 15 of the coaxial gear mechanism 1 via a sliding bearing surface 23. The bearing segments 17 are each pivotable in the circumferential direction in relation to respective adjacent bearing segments. The cam disk 15 is provided on a drive shaft 36. The drive shaft 36 is mounted on the housing via a second bearing so as to be rotatable about the axis of rotation 3. The second bearing comprises, for example, second rolling bodies 35 and an adjustment element 37. The adjustment element 37 is connected to the first housing part 31 of the housing for rotation therewith in FIG. 1. The profiling 25 of the cam disk 15 is designed in a manner encircling about the axis of rotation 3 and, in FIG. 1, has two axial elevations in the direction of the tooth pins 11.

Figure 2A:
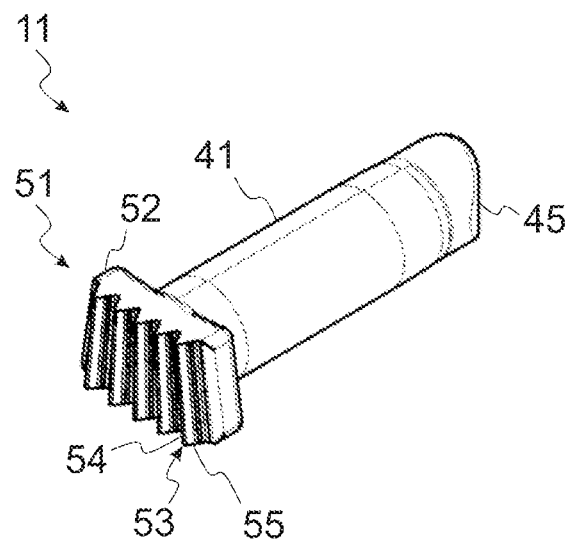
FIGS. 2A-C show schematic views of a tooth pin according to a typical embodiment.
Figures 2B, 2C:
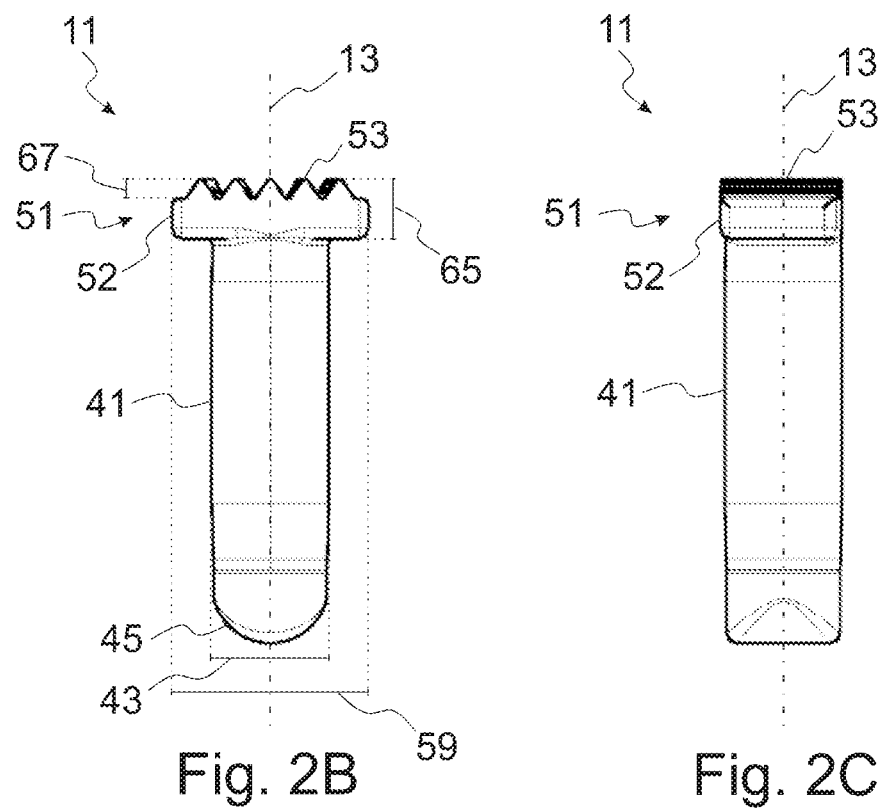

FIG. 2A shows a schematic isometric view of a tooth pin 11 with a tooth pin base 45, a body 41 and a head region 51. The head region 51 comprises a base 52 and teeth 53 arranged on the base 52, for example five teeth 53 in FIGS. 2A-2C. The teeth 53 each comprise two tooth flanks 55 and a tooth head 54. FIG. 2B shows the tooth pin 11 in a view radially from the outside in the direction of the axis of rotation. In FIG. 2B, the head region 51 is widened in the circumferential direction in relation to the body 41. In particular, a head region width 59 of the head region 51 is more than 1.5 times wider than a body diameter 43 of the body 41. The head region 51 has an axial height 65 in the direction of the longitudinal axis 13 of more than 1.5 times the tooth height 67 of the teeth 53. FIG. 2C shows a side view of the tooth pin 11 in the circumferential direction. In FIG. 2C, the head region 51 is the same width as the body 41 in the radial direction.

Figure 3:
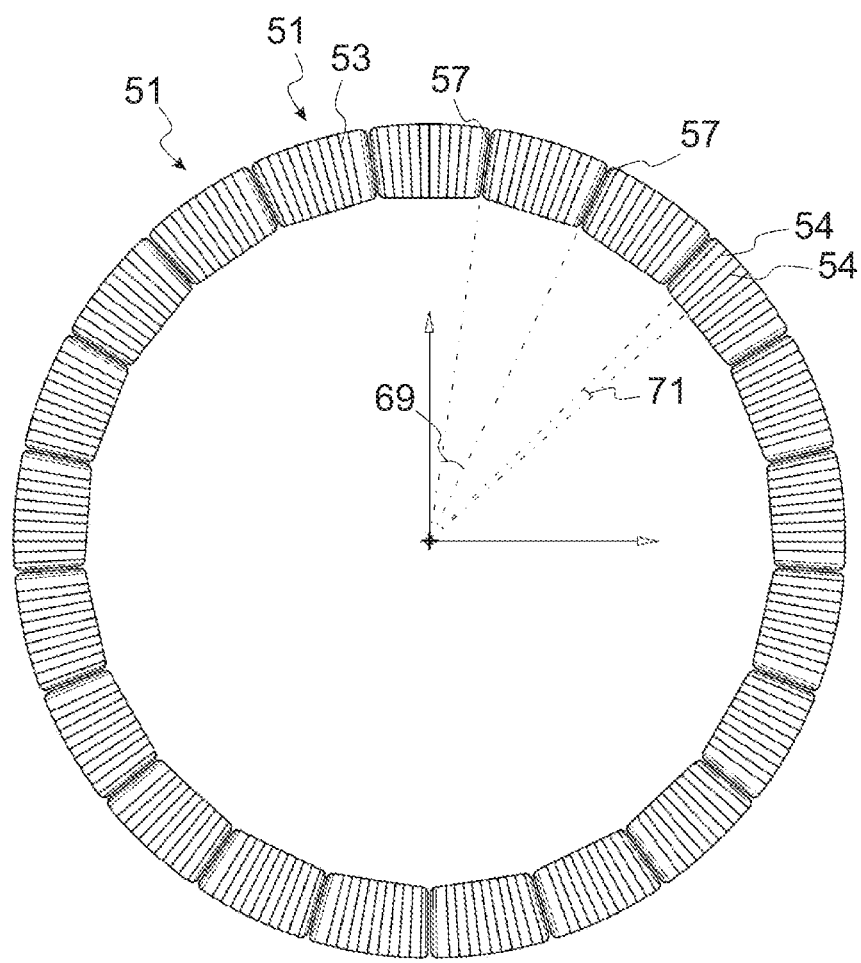
FIG. 3 shows a schematic view in the axial direction of head regions of tooth pins of a typical coaxial gear mechanism.
Figure 4D:
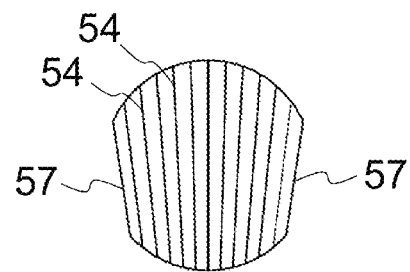
Figure 5:
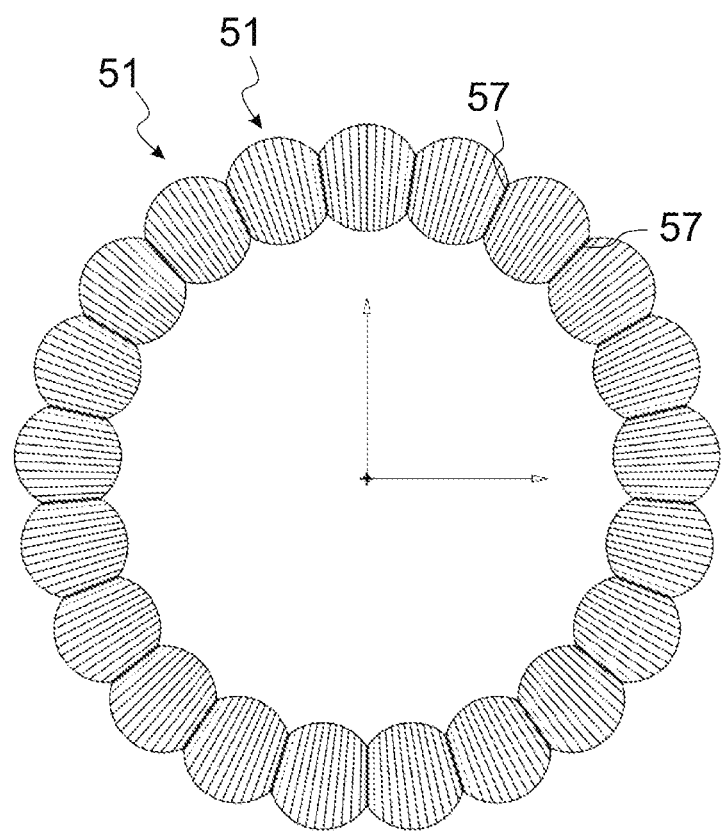
FIG. 5 shows a schematic view in the axial direction of head regions of tooth pins of a further typical coaxial gear mechanism.

FIG. 3 shows a schematic view in the axial direction of the tooth heads 51 of the tooth pins of a typical coaxial gear mechanism. In FIG. 3, FIG. 4D and FIG. 5, in each case in particular both the tooth heads 54 and also valleys between the teeth 53 or edges at the foot of the teeth 53 are illustrated on the respective tooth heads 51. The head regions 51, in particular the bases of the head regions 51, each have a first cross-sectional area perpendicular to the axis of rotation in FIG. 3. The first cross-sectional area is bounded in the circumferential direction by two edges 57 oriented radially with respect to the axis of rotation. The first cross-sectional area is bounded radially on the outside by an arc of a circle with a centre point on the axis of rotation, and radially on the inside, for example, by a straight line.

The head regions 51 have an angular width 69 with respect to the axis of rotation that is identical to a pitch angle of the tooth pins in the guides of the coaxial gear mechanism. The head regions 51 butt against one another in the circumferential direction. In particular, the head regions 51 form a sliding contact on radially oriented surfaces that comprise the edges 57 with head regions 51 which are adjacent in the circumferential direction. The head regions 51 can be supported on one another in the circumferential direction and are secured against rotation about a respective longitudinal axis of the tooth pins.

In FIG. 3, the teeth 53 of a head region 51 are arranged with a tooth pitch angle 71 on the base of the head region 51. The tooth pitch angle 71 is identical to a toothing pitch angle of the toothing of the coaxial gear mechanism.

Figure 4A:
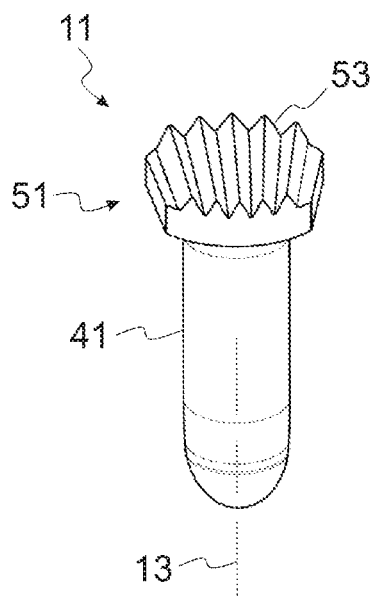
FIGS. 4A-D show schematic views of a tooth pin according to a further typical embodiment.
Figure 4B:
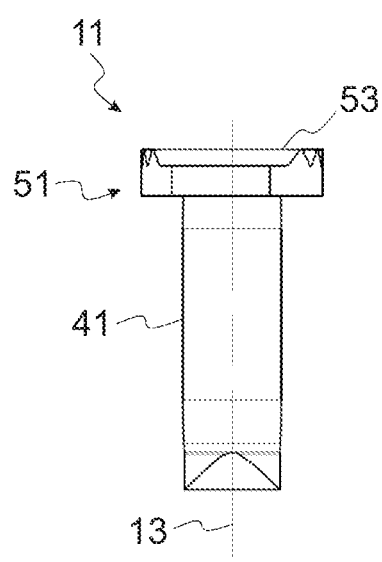
Figure 4C:
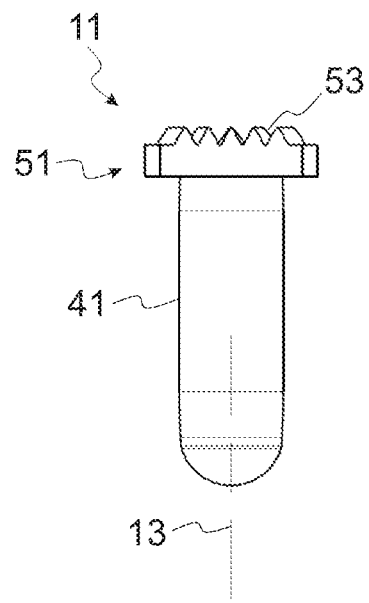

FIG. 4A shows a view of a tooth pin 11 according to a further typical embodiment. As shown in the side view of FIG. 4B and in the view of FIG. 4C from radially on the inside of the tooth pin 11, the head region 51 of the tooth pin 11 is widened in relation to the body 41 both in the circumferential direction and in the radial direction. FIG. 4D shows the head region 51 in a view in the axial direction. The head region 51 with teeth 53 and respective tooth heads 54 has a first cross-sectional area which forms a circular partial surface. The first cross-sectional area is bounded radially on the inside and radially on the outside in each case by an arc of a circle and in the circumferential direction by radially oriented edges 57. As illustrated in FIG. 5, the annularly arranged tooth pins which are mounted in a tooth carrier can be supported on one another in the circumferential direction on radially oriented surfaces having the radially oriented edges 57.

FIGS. 6A-C show views of a tooth pin 11 with a head region 51, wherein the head region 51 comprises an individual tooth 53. As shown in the view of FIG. 6A from radially on the inside of the tooth pin 11, a tooth width of the tooth 53 is identical to a head region width of the head region 51. The head region 51 is widened in relation to the body 41 in the circumferential direction. As shown in the side view in FIG. 6B, the head region 51 in the radial direction is configured, for example, to be identical in width to the body 41. FIG. 6C shows in particular a superimposition of a first cross-sectional area 61 of the head region 51 that is perpendicular to the longitudinal axis 13 of the tooth pin 11 and a second cross-sectional area 47 of the body 41 that is perpendicular to the longitudinal axis 13. For example, the first cross-sectional area 61 of the head region 51 is approximately twice as large as the second cross-sectional area 47 of the body 41. Embodiments with a head region which is widened in relation to the body can have in particular a higher load-bearing capacity or a higher stiffness, or can provide improved securing of the tooth pins against rotation about the respective longitudinal axis.

The invention claimed is:

1. Coaxial gear mechanism (1), having
a toothing (5) oriented axially with respect to an axis of rotation (3) of the coaxial gear mechanism (1),
a tooth carrier (7) with axially oriented guides (9),
tooth pins (11) which each comprise a body (41), which is mounted in an axially displaceable manner in a guide (9) of the tooth carrier (7), an axial cam disk (15) for axially driving the tooth pins (11), the cam disk (15) being rotatable about the axis of rotation, wherein each of the tooth pins (11) further comprises a head region (51), the head region (51) comprising at least one tooth (53) for engagement with the toothing (5), and
wherein the head region (51) is configured to be wider than the body (41).

2. Coaxial gear mechanism (1) according to claim 1, wherein the head region (51) is configured to be wider than the body (41) in the circumferential direction about the axis of rotation (3).

3. Coaxial gear mechanism (1) according to claim 1, wherein the head region (51) is configured to be wider than the body (41) in the radial direction.

4. Coaxial gear mechanism (1) according to claim 1, wherein a first cross-sectional area (61) of the head region (51) that is perpendicular to a longitudinal axis (13) of the tooth pin (11) comprises two edges (57) oriented radially with respect to the axis of rotation (3).

5. Coaxial gear mechanism (1) according to claim 4, wherein the first cross-sectional area (61) of the head region (51) at least substantially forms a trapezoid, a section of a circular ring or a circular partial surface.

6. Coaxial gear mechanism (1) according to claim 1, wherein an angular width (69) of the head region (51) with respect to the axis of rotation (3) is at least substantially identical to a pitch angle of the tooth pins (11).

7. Coaxial gear mechanism (1) according to claim 1, wherein a second cross-sectional area (47) of the body (41) that is perpendicular to a longitudinal axis (13) of the tooth pin (11) is configured to be round.

8. Coaxial gear mechanism (1) according to claim 1, wherein the head region (51) forms a sliding contact with head regions (51) of tooth pins (11) which are adjacent in the circumferential direction.

9. Coaxial gear mechanism (1) according to claim 1, with a rotation lock which comprises a sliding surface for sliding contact with a radial inner surface of the head region (51) and/or a radial outer surface of the head region (51).

10. Coaxial gear mechanism (1) according to claim 9, wherein the rotation lock is connected to the tooth carrier (7) for rotation therewith or to a housing of the coaxial gear mechanism (1) for rotation therewith.

11. Coaxial gear mechanism (1) according to claim 1, wherein the head region (51) in the axial direction has an axial height (65) of at least 1.5 times the tooth height (67) of the at least one tooth (53).

12. Coaxial gear mechanism (1) according to claim 2, wherein a head region width (59) of the head region (51) in the circumferential direction is at least 1.2 times wider than a body diameter (43) of the body (41) in the circumferential direction.

13. Coaxial gear mechanism (1) according to claim 12, wherein the head region width (5a) is at least 1.5 times wider than the body diameter (43).

14. Coaxial gear mechanism (1) according to claim 1, wherein the head region (51) comprises at least two teeth (53) for engagement with the toothing (5).

15. Coaxial gear mechanism (1) according to claim 14, wherein a tooth pitch angle (71) of the at least two teeth (53) of the head region (51) is at least substantially identical to a multiple of a toothing pitch angle of the toothing (5).

* * * * *